Feb. 22, 1938.   G. W. BUNGAY   2,109,207
METHOD FOR CASTING STEREOTYPE PLATES
Filed Sept. 26, 1934   10 Sheets-Sheet 8

Patented Feb. 22, 1938

2,109,207

UNITED STATES PATENT OFFICE 2,109,207

METHOD FOR CASTING STEREOTYPE PLATES

George W. Bungay, Plainfield, N. J., assignor to Bungaytype-Delaware, Inc., New York, N. Y., a corporation of Delaware Application September 26, 1934, Serial No. 745,550

5 Claims. (Cl. 22—200)

This invention relates to the casting of stereotype plates, and more particularly to a method and apparatus for casting stereotype plates suitable for high quality printing.

Stereotype plates have heretofore been generally considered unsuitable for high quality printing for various reasons well known in the printing art. For example, the printing surface may be irregular due to imperfections in the matrix, uneven cooling of the metal, shrinkage of the metal away from the matrix, bulging of the matrix due to expansion, poorly controlled temperatures, etc. Different plates may be of non-uniform size because of unequal expansion of the matrix, non-uniform shrinkage of the metal, differences in casting temperatures, differences in rates of cooling, and, in general, because of the difficulty in casting two plates under exactly the same conditions.

For these reasons stereotype plates do not possess the definition or registration required for half-tone color printing and quality magazine work, circulars, and the like, and recourse has been had to electrotype plates for this type of printing, although electrotype plates are expensive, require considerable time to produce, and are generally unsuited for work requiring cheapness and speed.

It is accordingly an object of this invention to render stereotype plates suitable for high quality printing.

Another object is to improve stereotype plates so that they may compete with electrotype plates as to quality of printing.

Another object is to increase the usefulness and availability of stereotype plates.

Another object is to provide a method of casting stereotype plates having uniform printing surfaces, improved definition and registration, greater depth of printing faces, and in general having characteristics suitable for high quality printing.

Another object is to provide a simple, convenient, efficient and dependable apparatus for accomplishing the above purposes.

Another object is to provide a stereotype casting machine of the above type which is convenient and simple to operate.

The invention also consists in the various new and original features of construction and combinations of parts hereinafter set forth and claimed.

A feature of the invention consists in casting the sterotype plate under a pressure adapted to cause the molten metal to penetrate the various impressions in the matrix and in maintaining the metal in pressure engagement with the matrix while the metal cools to the temperature at which it is removed from the casting machine.

In one embodiment, this is accomplished by applying mechanical pressure to the molten metal, accompanied by an impact, sufficient to compress the metal and to cause the metal to penetrate the impressions in the matrix. The edges of the matrix are firmly clamped in position, and, as the metal cools and becomes solidified, fluid pressure is applied to the back surface thereof to hold the printing face firmly against the matrix and to exert sufficient pressure on the matrix to prevent the same from bulging or otherwise distorting due, for example, to expansion caused by the heat of the molten metal. Hence, the stereotype plate is caused to accurately reproduce the original printing form both as to size and registration, a feature particularly important, for example, in half-tone color printing where accurate registration of the half-tone dots is essential.

The present invention also provides a simplified means for casting a stereotype plate with a finished printing face. This is accomplished by forming the matrix so that the impressions therein are held in correct position in the casting box to reproduce the original printing form in the cast plate and in casting under sufficient pressure to insure penetration of the matrix impressions by the molten metal.

Another feature of the invention consists in the provision of means for maintaining the casting machine at a predetermined temperature during the casting operations. The casting is preferably removed from the machine at an elevated temperature and the cooling is completed under conditions which prevent warping thereof.

Another feature consists in maintaining transverse pressure on the back of the cast plate to compensate for shrinkage and to maintain the plate in pressure engagement with the matrix while cooling.

Another feature consists in casting the stereotype plates under controlled conditions so that the various plates are uniform as to size, definition, registration, etc.

Various other features and advantages will be apparent as the nature of the invention is more fully disclosed.

Although the various novel features which are believed to be characteristic of this invention will be pointed out in the claims appended thereto, the invention itself, as to its objects and advantages and the manner of its operation, may be better understood by referring to the following description taken in connection with the accompanying drawings illustrating one embodiment thereof.

In the drawings.

In the various figures like parts have been indicated by like reference numerals.

In the following description and in the claims, various details will be identified by specific names for convenience, but they are intended to be as generic in their application as the art will permit.

Figure 1:
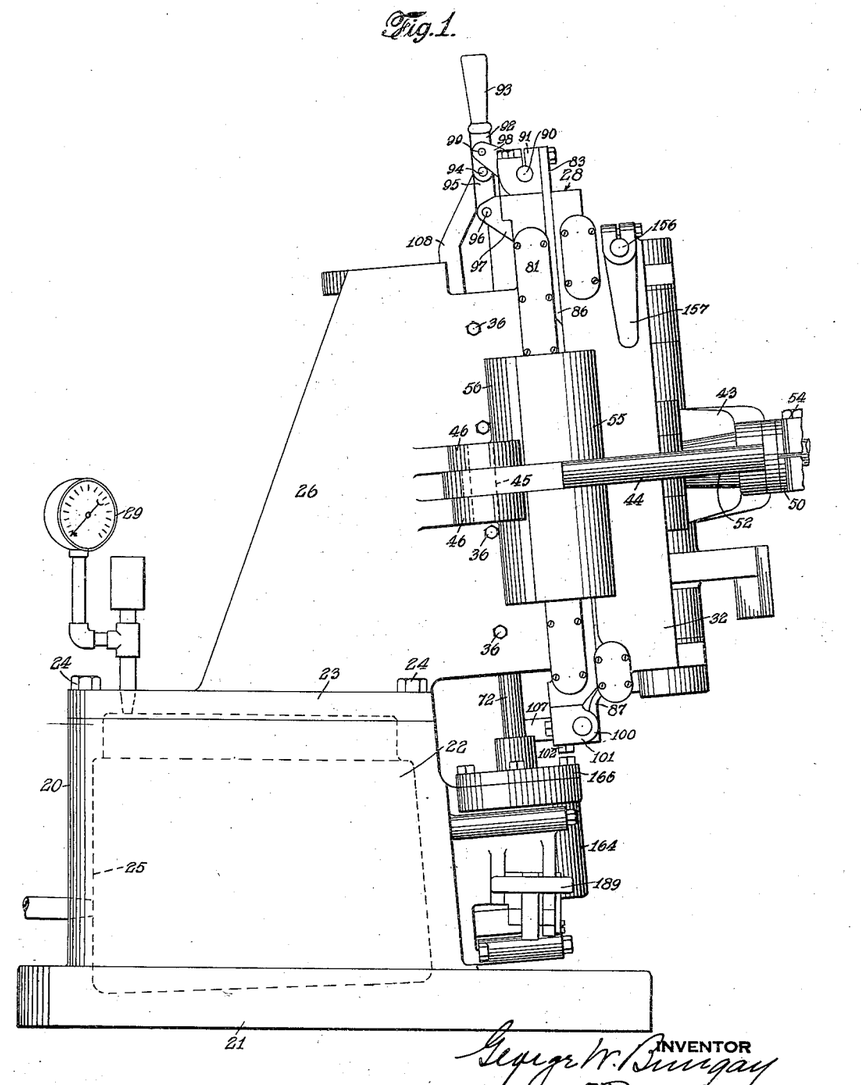
Figure 1 is a side elevation of a casting machine constructed in accordance with this invention.
Figure 4:
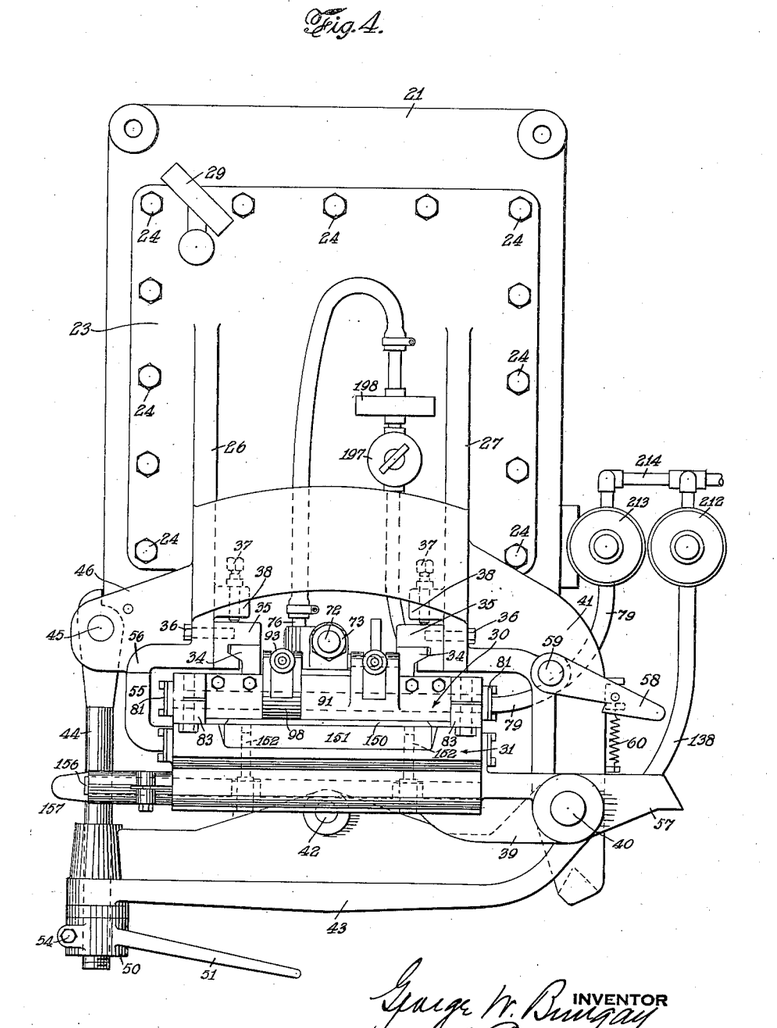
Figure 4 is a top plan view thereof.

Referring to the embodiment of the invention shown in the drawings, the casting machine is illustrated as comprising a hollow pedestal 20 (Figure 1) which may comprise a base 21 with upstanding sides 22, preferably cast integrally therewith, and having a cover 23 secured thereto, as by bolts 24, to provide an air-tight chamber 25 adapted to constitute a compressed air reservoir. A pressure gage 29 may be associated therewith, if desired, to indicate the air pressure within said reservoir. The cover 23 may have webs 26, 27 integrally cast therewith (Figures 1 and 4) to form the main support for the mold or casting box 28. The mold 28 comprises a backing member or slide 30 (Figures 4–8, 10) and a hinged matrix holder 31 comprising a frame 32 and a matrix plate 33.

The slide 30 may be provided with lugs 34 (Figures 4 and 6) which may be cast integrally therewith and may slidably engage guides 35 which are adjustably mounted on the webs 26, 27, as by bolts 36, extending preferably through enlarged holes in said webs to permit transverse adjustment of said guides. Such adjustment may be effected by means of adjusting bolts 37 bearing against said guides 35 and carried in lugs 38 formed on the webs 26, 27.

Figure 2:
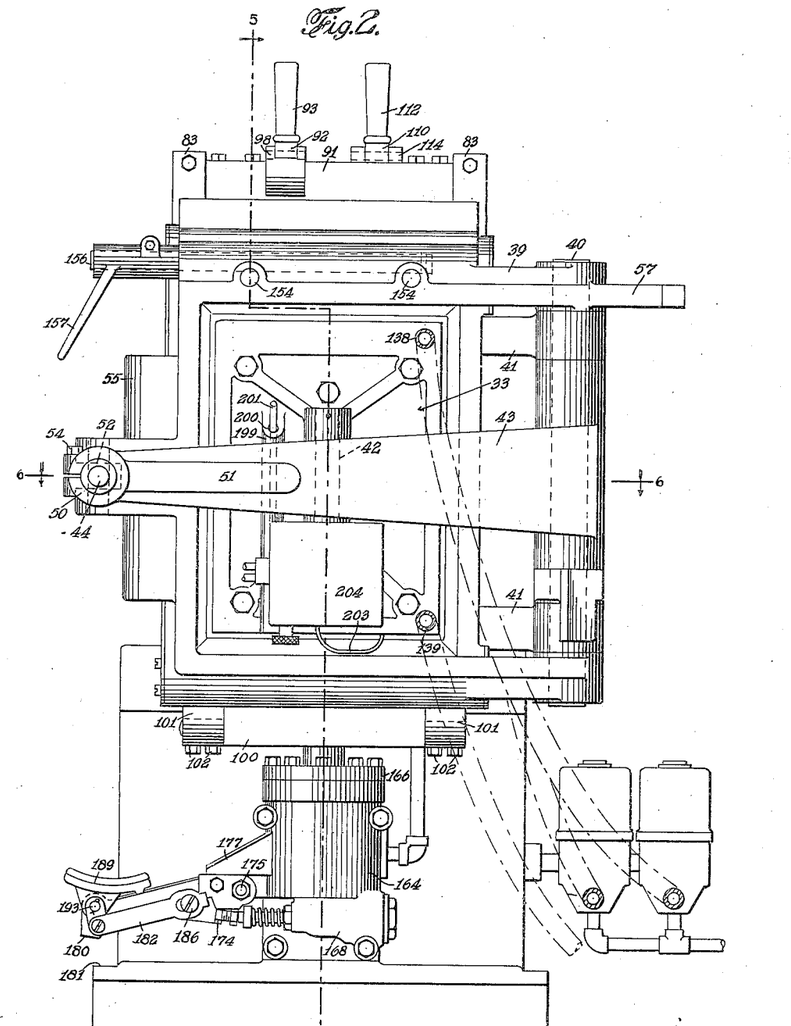
Figure 2 is a front elevation of the machine illustrated in Figure 1.
Figure 3:
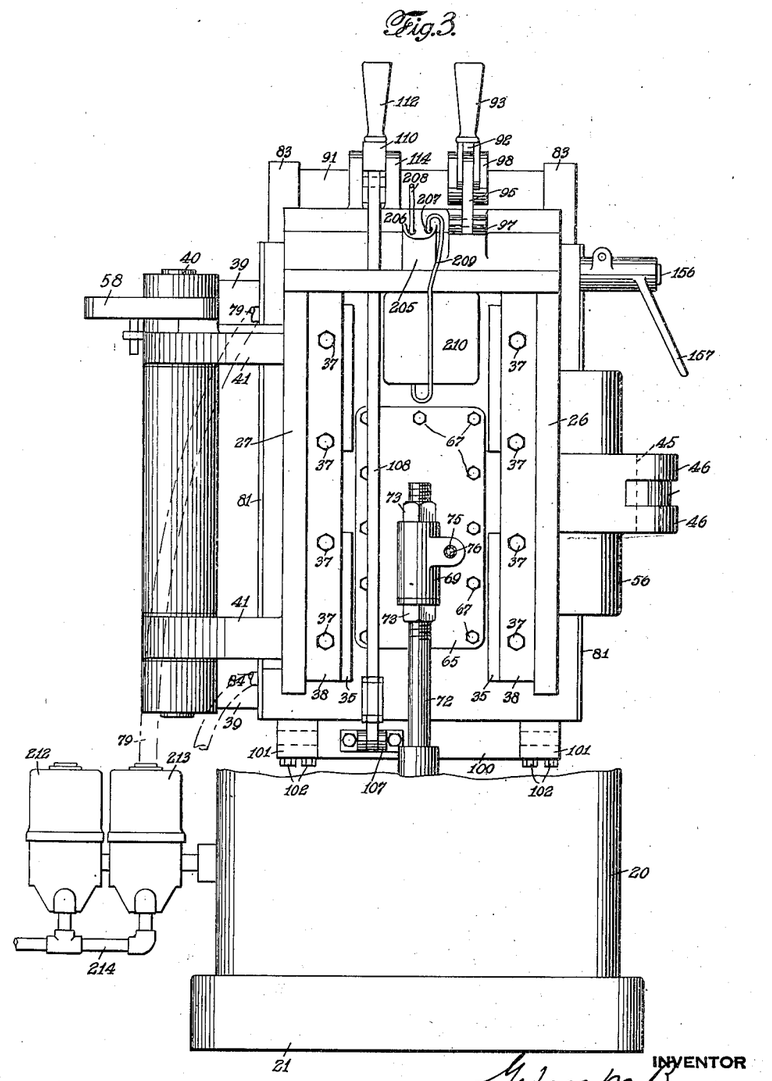
Figure 3 is a rear elevation thereof.

The frame 32 may be hinged by arms 39 (Figures 2, 4 and 7) to a pin 40 which is carried in ears 41 supported by the web 27. The matrix plate 33 may be pivotally mounted, as by a pin 42, on an arm 43, likewise carried by the pin 40.

The mold is held in the closed position by means of a rod 44 pivoted, as by a pin 45, to ears 46 which may be carried by the web 26. The rod 44 engages a slot 52 (Figure 2) formed in the free end of the arm 43 and is secured by a split clamping nut 50 having an operating handle 51. The split clamping nut 50 may be locked in position on the threaded end of the rod 44 by a bolt 54. A flange 55 may be associated with the frame 32 and adapted to engage a positioning flange 56 carried by the web 26 to determine the position of the matrix holder 31 when closed and to prevent the holder from exerting sufficient pressure upon the slide 30 to interfere with the operation thereof.

The frame 32 may carry an arm 57 (Figures 2, 4 and 7) adapted to engage a latch 58 to lock the frame and matrix plate in open position. The latch 58 may be pivoted to one of the ears 41 of the web 27, as by a pin 59, and may be held in cooperative position with respect to the arm 57 by a spring 60. The latch 58 may be manually released when the mold 28 is to be closed. The mold 28 is mounted at a slight inclination to the vertical, for example 5°, so that the molten metal flows down the slide 30, generally out of contact with the matrix on the matrix holder 31, thereby protecting the matrix from injury or distortion due to contact with the stream of hot metal.

The slide 30 (Figures 5–8, and 11) is formed with a plane surface 61 constituting the back of the mold cavity, and with a surface 62, offset with respect to the surface 61, and connected thereto by a beveled surface 63 which is adapted to guide the metal to the mold cavity during the pouring operation. A cover plate 65 may be secured to a bead 66 (Figures 3, 5–7, and 11) formed on the back of the slide 30, as by bolts 67, to form a chamber 70 adapted to receive compressed air for the purpose to be described. A plurality of transverse bores 71 are formed in the slide 30 and extend from the chamber 70 to the surface 61 of said slide. Certain of said bores may be inclined to the transverse axis of the machine so that a greater separation is effected at the surface 61 than at the chamber 70, thereby distributing the air from the chamber 70 over a greater area of said surface for the purpose to be described.

The cover plate 65 also carries a lug 69 adapted to receive a shaft 72, which may be secured by positioning nuts 73, and may be connected to a suitable piston 74 (Figures 4 and 5), by which vertical movement of the slide 30 is effected. The lug 69 may also be provided with a transverse port 75, communicating with the chamber 70, and adapted to receive a pipe 76 through which compressed air is supplied.

The slide 30 may be provided with a plurality of transverse bores 77 (Figures 5–8, 11) communicating with side channels 80 closed by cover plates 81 held, for example, by screws 82. A coiled pipe 78 may be held in the bores 77 and channels 80 and may connect with flexible pipes 79, 84 (Figures 3, 4) through which a cooling fluid, such as water, may be circulated to maintain the slide at a desired casting temperature. Obviously, the pipe may be cast directly into the slide or the slide may be cast around the formed pipe so as to obtain an efficient heat transfer relationship.

Figure 5:
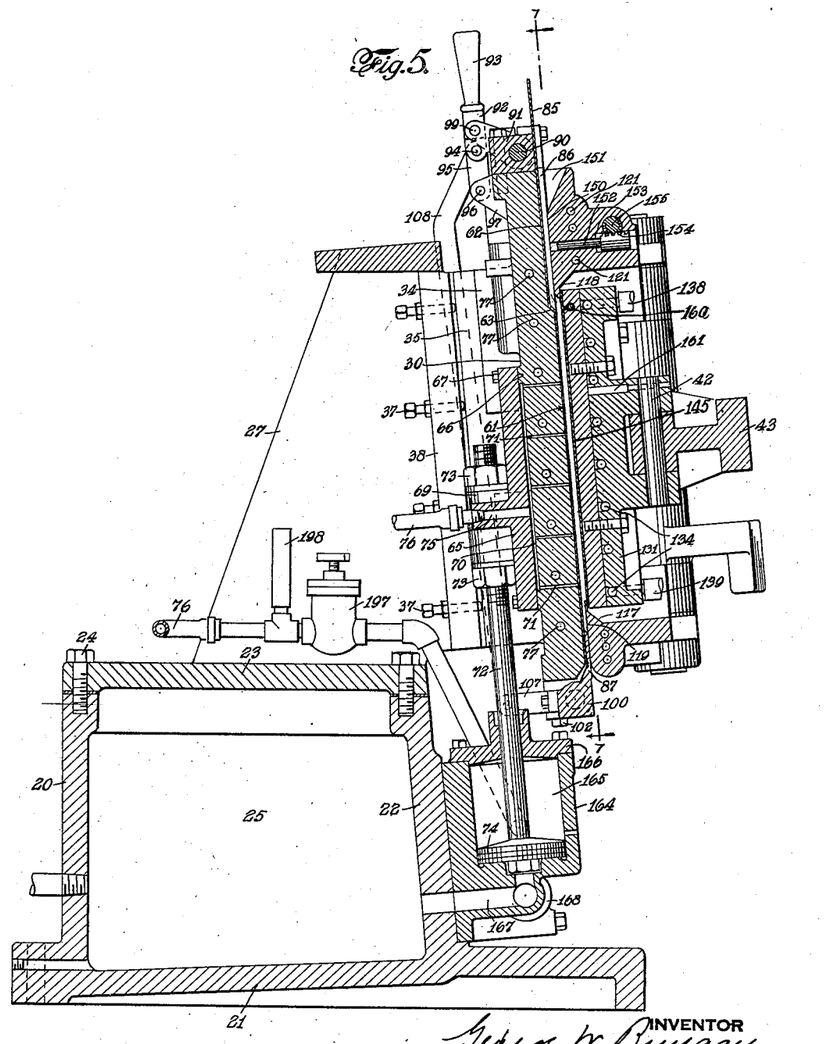
Figure 5 is a vertical section taken on the line 5—5 of Figure 2.
Figure 6:
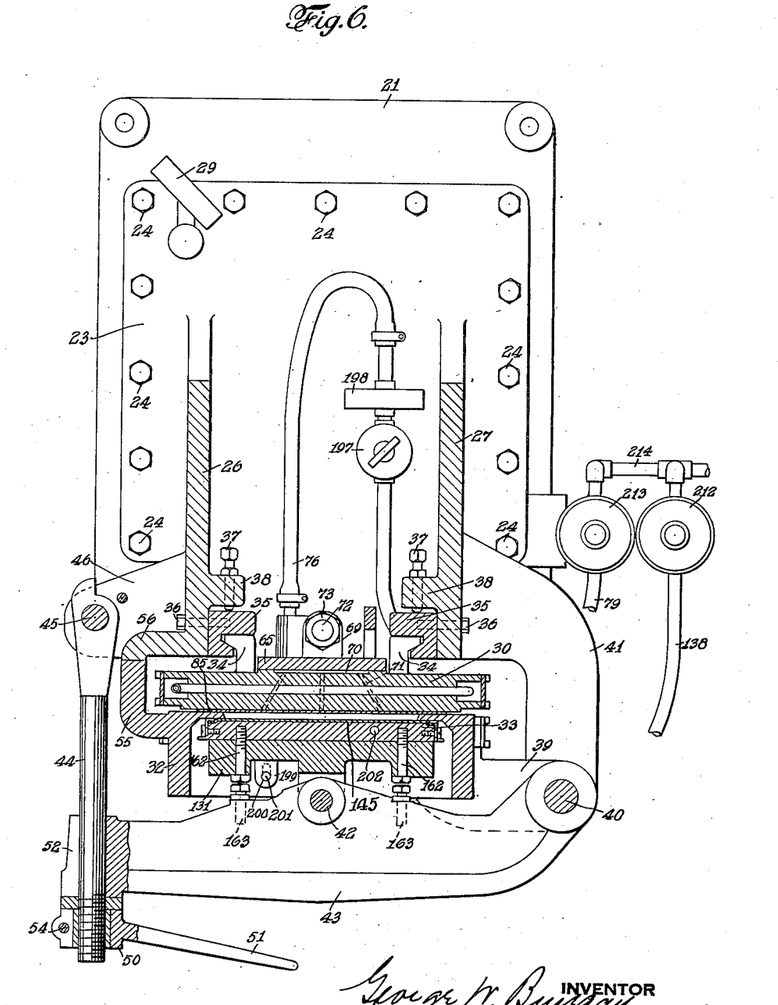
Figure 6 is a horizontal section taken on the line 6—6 of Figure 2.
Figure 8:
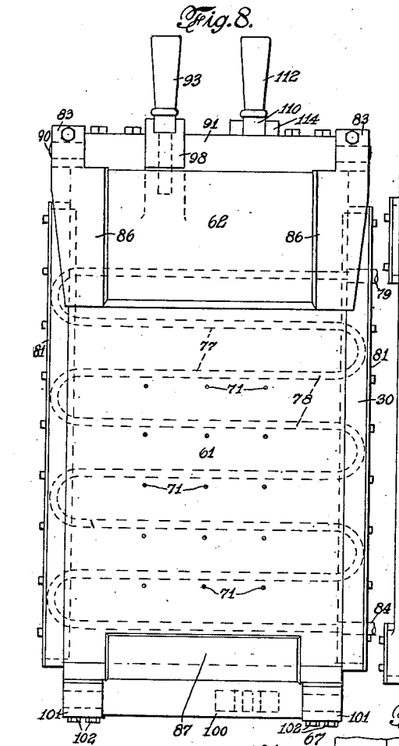
Figure 8 is a front elevation of the slide.
Figures 9, 10:
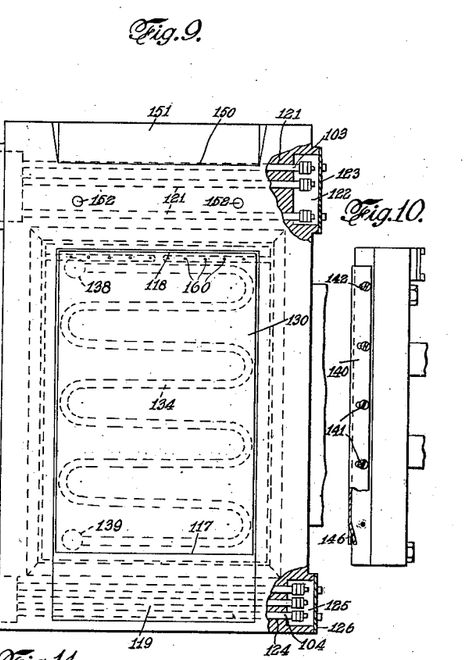
Figure 9 is a front elevation of the matrix holder.
Figure 10 is a partial side elevation of the matrix plate.
Figure 11:
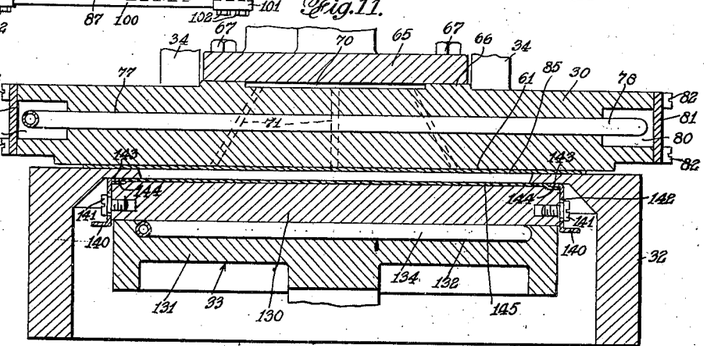
Figure 11 is an enlarged transverse section through the mold.
Figures 12, 13:
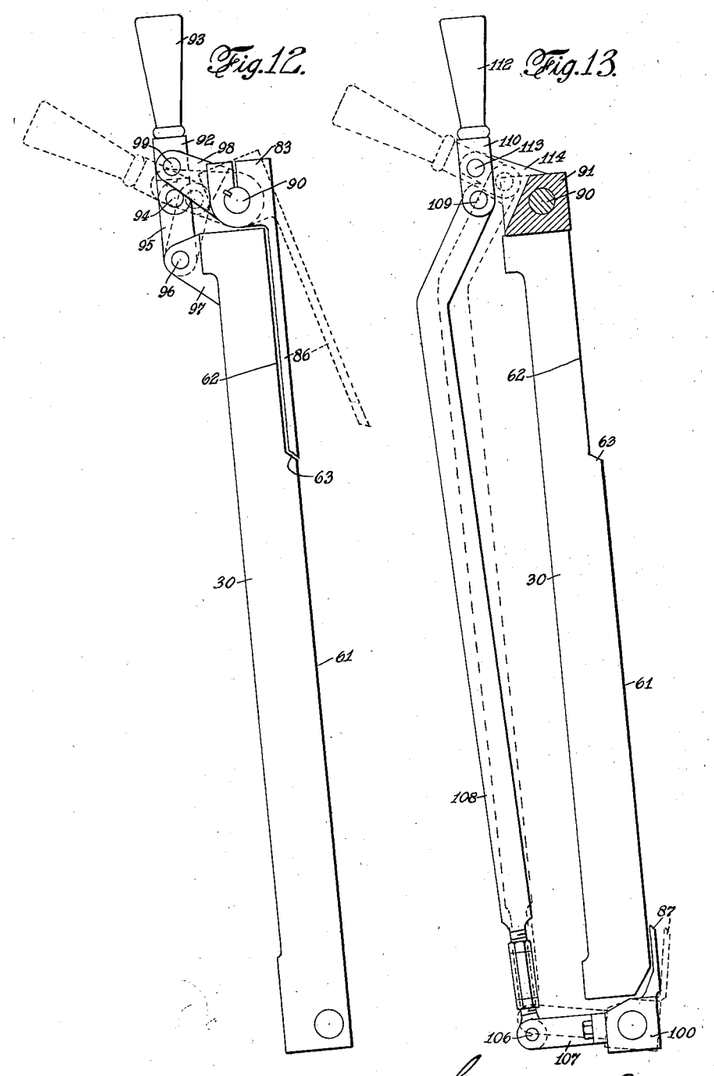
Figure 12 is a detail of the operating lever for the upper backing paper clamps.
Figure 13 is a detail view of the operating lever for the lower backing paper clamp.

During the casting operation, the slide 30 is adapted to be covered with backing paper 85, such as a heavy calendered paper (Figures 5, 8 and 11). For securing this paper in place, a pair of upper clamps 86 and a lower clamp 87 are provided. The clamps 86 are adapted to rest upon the surface 62 of the slide 30 and extend to a point adjacent the beveled surface 63 thereof. Said clamps 86 may be provided with hub portions 83 offset laterally to afford clearance for the backing paper 85, and keyed to a shaft 90 (Figures 4, 8 and 12), which is carried in suitable supports 91 formed on the slide 30. For operating the clamps 86, a lever 92 is provided, having a handle 93, and is pivoted at one end, as at 94, to a link 95. The link 95 is pivoted at 96 to a lug 97 formed as a part of the slide 30. An arm 98 is keyed to the shaft 90 and is pivoted, as at 99, to the lever 92. The arrangement is such that the lever 92 and the link 95 constitute a toggle joint which, in the position illustrated in full lines in Figure 12, holds the clamps 86 securely against the backing paper 85. When the lever 92 is moved to the position illustrated in dotted lines in Figure 12, the toggle is broken and pivotal movement of the arm 98 causes the shaft 90 to rotate and thereby to swing the clamps 86 away from the backing paper for releasing the same.

The lower clamp 87 is carried by a support 100 (Figures 5, 8 and 13) which is journaled between spaced bearing blocks 101 secured to the bottom of the slide 30 by bolts 102. The support 100 may have an arm 107 associated therewith and pivoted at 106 to an adjustable link 108, which, in turn, is pivoted at 109 to a lever 110 having a handle 112. The lever 110 is pivoted at 113 to ears 114 carried by the slide 30. When the lever 110 is in vertical position, as illustrated in full lines in Figure 13, the lower clamp 87 is held securely against the backing paper 85 on the surface 61 of the slide 30, but when the lever 110 is in the position shown in dotted lines in Figure 13, the link 108 is elevated, thereby swinging the clamp 87 away from the surface 61 and releasing the backing paper 85 therefrom.

The frame 32 is provided with marginal side flanges 116, a bottom flange 117, and a top flange 118 (Figures 5–7, 9 and 11) adapted to form a liquid-tight seal with the surface 61 of the slide 30 or with the backing paper 85 which may be positioned thereon. The bottom flange 117 may have a recess 119 to slidably receive the lower clamp 87 and to effect a seal therewith. The flanges 116, 117 and 118 form the sides of the mold and define the peripheral edges of the cast stereotype plate. The clamp 87 constitutes a plunger to apply pressure to the molten metal in the mold cavity. The flange 118 is spaced from the surface 62 to provide a passage 150 terminating in a flared opening 151 through which the molten metal may be poured when the slide is in its lower position. When the slide is raised, the surface 61 engages the flange 118 to close said passage and confine the molten metal under the pressure applied by said clamp 87.

The frame 32 may be provided with knock-out plungers 152 seated, for example, in transverse recesses 153 in said frame (Figures 5 and 9), and having racks 154 engaging a gear 155 which is carried on a shaft 156 (Figures 1–5) journaled in said frame and having an operating handle 157 keyed thereto. When the plungers 152 are retracted, molten metal may enter the recesses 153 and form slugs which cause the solidified riser or gate between the flange 118 and the surface 62 to adhere to the flange 118 when the mold is opened. When the handle 157 is rotated, the knock-out plungers 152 push the slugs out of the recesses 153 and release the solidified riser from the flange 118.

The frame 32 may also be provided with a plurality of upper horizontal bores 121 adapted to receive electrical heating rods 103 of any standard type which may terminate in side channels 122, closed, if desired, by a cover plate 123. The frame 32 may also be provided with lower horizontal bores 124 adapted to receive similar heating rods 104, terminating in side channels 125 covered, if desired, by a cover plate 126.

The matrix plate 33 may comprise a front section 130 and a back section 131 having suitable grooves 132 formed therebetween to receive a coiled pipe 134 (Figures 2, 5, 6, 9 and 11), having terminals connected to flexible pipes 138, 139 through which a cooling fluid, such as water, may be circulated. The pipe 134 may be integrally formed or cast into the matrix plate 33 or the matrix plate 33 may be cast as a single section around the formed pipe 134, as desired.

Said matrix plate 33 may be provided with a pair of side clamps 140 secured to the edges thereof, as by screws 141, extending through elongated slots 142 (Figures 10 and 11) formed in said side clamps to permit transverse movement thereof with respect to the matrix plate. Said clamps 140 may be provided with flanges 143 which are adapted to seat in grooves 144 formed at the two side edges of the matrix plate for gripping the edges of the matrix. Spring fingers 146 may be formed at the bottom of the flanges 143 to hold the lower edge of the matrix while the mold is in open position.

The pressure of the side flanges 116 on the clamps 140, as the matrix plate 33 is closed against the frame 32, causes the flanges 143 to engage a matrix 145 and to pull the side edges into the grooves 144, thereby pulling the matrix tightly against the matrix plate 33. The clamps 140 also hold the matrix on the matrix plate 33 when the mold is opened for removal of the cast stereotype plate. When the mold is in closed position, the matrix is held against the flanges 116, 117 and 118 of the frame 32 which extend entirely around the periphery of the matrix and securely clamp the marginal edges thereof.

The matrix plate 33 may be provided with a plurality of apertures 160 located in a row across the top thereof (Figures 5 and 9) and communicating with bores 161 terminating at the edges of said plate. The apertures 160 serve to release any air which may become entrapped at the back of the matrix 145 during the casting operation and to prevent the same from being compressed and interfering with the normal position of the matrix against the matrix plate.

Pivotal adjustment of the matrix plate 33 is obtained by means of bolts 162 (Figures 6 and 7), carried in said plate 33, and engaging adjustable bolts 163 carried on the arm 43, the adjustment being such as to permit a slight pivotal movement of the matrix plate about the pin 42, so that the plate may firmly seat against the flanges 116, 117 and 118 of the frame 32 when the mold is in closed position.

For operating the slide there is provided a housing 164 having a cylinder 165 therein (Figures 1, 2, 5, 14 and 15) in which the piston 74 is seated. The housing 164 may be carried on the pedestal 20 and may be provided with a cap 166 through which the shaft 72 extends. The cylinder 165 communicates through a bore 167 with the air reservoir 25 and is provided with a valve mechanism comprising a housing 168 and a valve 169 adapted to seat thereon for controlling the flow of air from the reservoir to the cylinder. The valve 169 may be mounted on a stem 170 and normally held in closed position by a spring 171. For releasing the same, a foot lever 172 is provided having an abutment 173 adapted to bear against an adjustable bolt 174 carried by the stem 170.

The lever 172 may be formed with a hub 175 which may be pivoted, as by a pin 176, between ears 177 formed on the housing 164. The lever 172 is also provided with a shoulder 180 which is adapted to engage an abutment 181 formed on the base 21 to limit the downward movement of the lever.

For locking the lever 172 in its lower position, there is provided a link 182 having a shoulder 183 adapted to engage an abutment 184 formed on a plate 185 which may be secured to the housing 164 in any convenient manner. The link 182 may slidably engage a screw 186 and may be pivotally connected, as at 187, to one web 188 of a foot pedal 189, having a rear edge 190 and a front edge 191. The foot pedal 189 is provided with a pair of webs 188, which extend on opposite sides of the lever 172, and are pivoted thereto, as by a pin 193.

Figure 14:
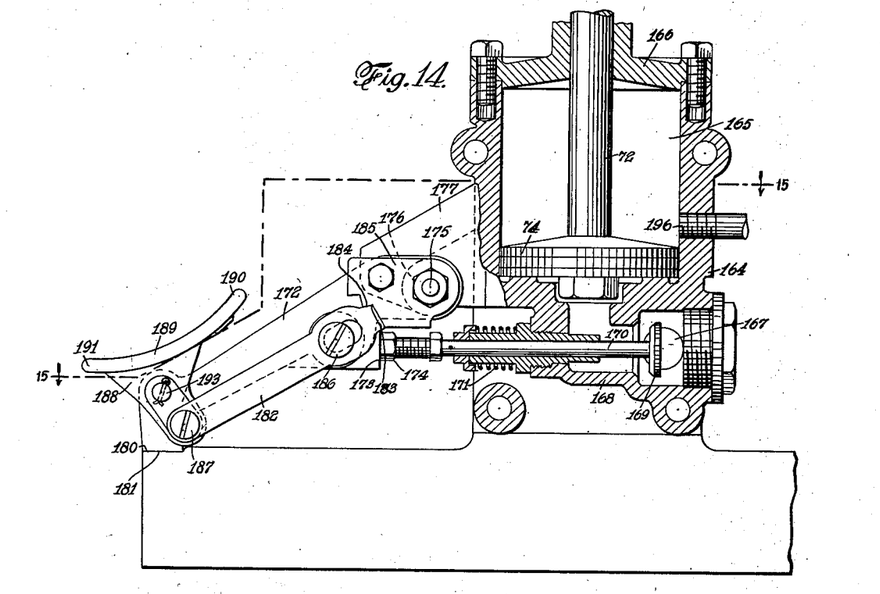
Figure 14 is a detail view, partly in section, showing the air cylinder and control pedal.
Figure 15:
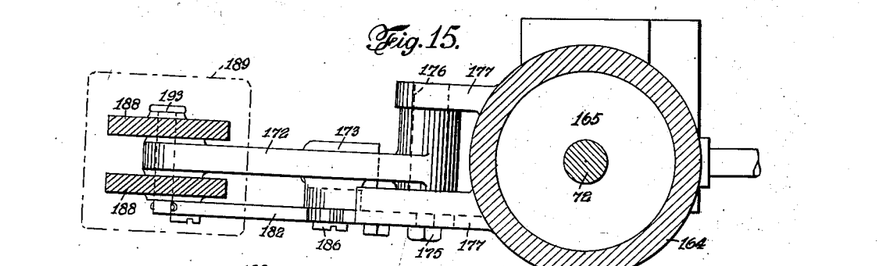
Figure 15 is a section taken on the line 15—15 of Figure 14.

The arrangement is such that pressure on the front edge 191 of the foot pedal 189 depresses the lever 172 and causes the link 182 to lock against the abutment 184, as illustrated in Figure 14, thereby opening the valve 169 and holding the same in open position. Pressure on the rear edge 190 of the pedal 189 causes pivotal movement of the pedal about the pin 193, thereby withdrawing the link 182 from engagement with the abutment 184 and permitting the valve 169 to be closed by the action of the spring 171.

The cylinder 165 is closed at the top whereby upward movement of the piston compresses the air trapped within the upper part of the cylinder and forms a cushion to retard the movement of the piston and the associated mechanism.

A port 196 may be located in the housing 164 in a position to be uncovered when the piston has neared the end of its normal operating stroke. This port 196 is connected, through a pressure-reduction valve 197 and a gage 198, to the pipe 76 by which air is applied to the chamber 70 at the back of the slide 30.

The matrix plate 33 may be provided with a boss 199 (Figures 2 and 6) having a well 200 rearwardly inclined to receive a thermometer 201 and with a well 202 adapted to receive the bulb 203 of a thermal-responsive device 204. A boss 205 may be formed on the slide 30 (Figure 3) having wells 206, 207 to receive a thermometer 208 and the bulb 209 of a thermal-responsive device 210 respectively.

Figure 16:
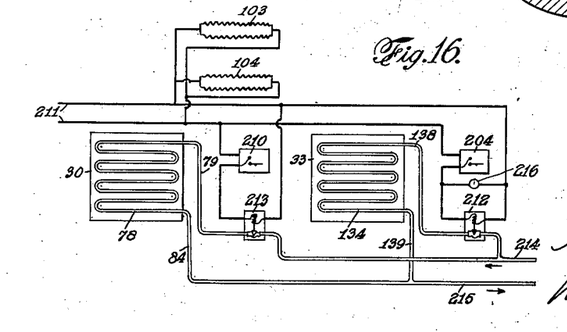
Figure 16 is a diagrammatic representation of the cooling and heating system.

The thermal-responsive devices 204 and 210 may constitute make and break relays operated by an expansible fluid contained in the bulbs 203 and 209 in response to temperature variations in the matrix plate 33 and in the slide 30 respectively. They may be supported on the apparatus in any convenient position and may be connected to a supply main 211 (Figure 16) to control the current to solenoid valves 212, 213 respectively which are connected in the pipes 138 and 79 to control the flow of cooling water through the coils 134 and 78 respectively. The valves 212, 213 may be connected to a supply line 214 and the flexible pipes 84 and 139 may be connected to a discharge line 215. The thermal-responsive relays 204, 210 and the valves 212, 213 may be of any standard type adapted to admit cooling water at a given maximum temperature and to interrupt the flow of cooling water at a given minimum temperature. A signal light 216 may be connected in parallel with the solenoid valve 212 so as to indicate when the temperature conditions of the matrix plate are such as to require cooling water, in which case the temperature is too high for pouring.

The valves 212, 213 may be supported by the pedestal 20 in any convenient position. Suitable connections are also made from main 211 to the heating rods 103, 104 so that these rods are energized whenever the main switch (not shown) is closed.

In the operation of this device, the backing paper 85, which preferably comprises a sheet of strong calendered paper, is inserted under the clamps 86 and between the hub portions 83 thereof, and is extended downwardly under the lower clamp 87, the clamps 86 and 87 being released by suitable operation of the levers 92 and 110 for this purpose. Thereafter, said levers are operated to cause the clamps 86 and 87 to engage the backing paper and to securely hold the same in position. The clamps 86 are adapted to cause the paper to bend over the inclined surface 63 of the slide 30 and are of such thickness that the face of the clamps 86 and the face of the backing paper over the surface 61 lie in substantially the same plane.

Figure 7:
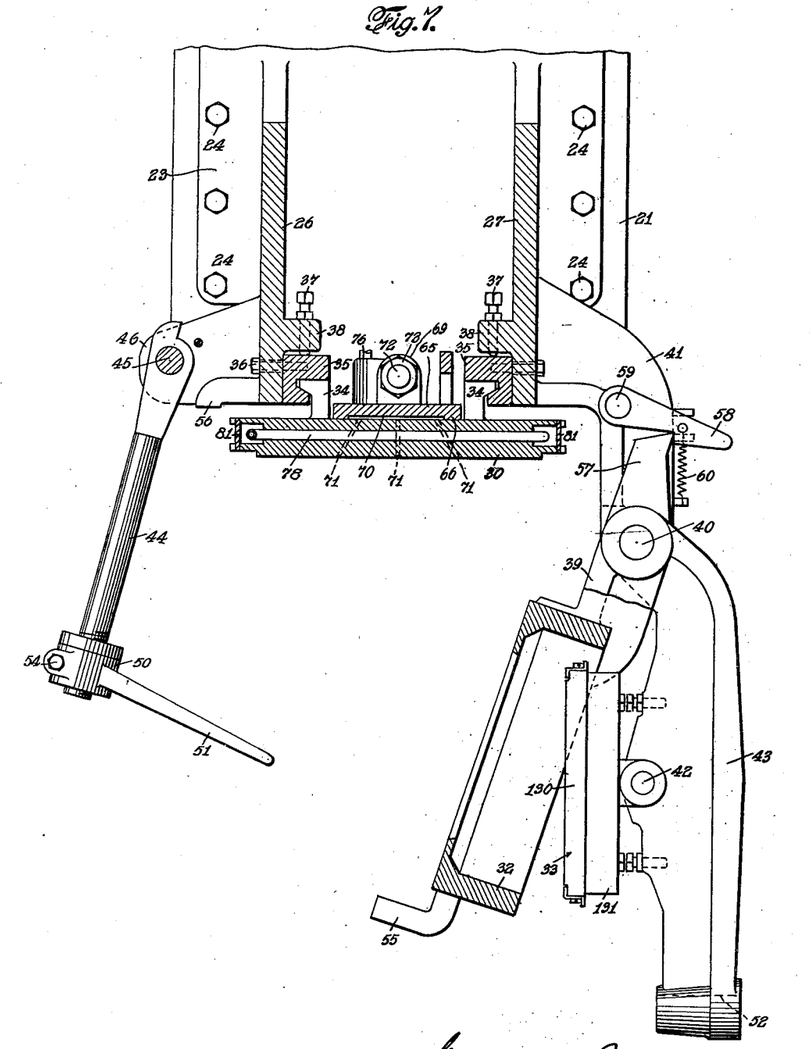
Figure 7 is a horizontal section similar to Figure 6 but with the mold in open position.

The matrix is applied to the matrix plate 33, preferably while at a high temperature, when the mold is open, as in Figure 7, and is temporarily held by the clamping strips 140. Thereafter, the frame 32 and the matrix plate 33, with the matrix in position thereon, are swung into closed position. When the matrix plate 33 comes in contact with the flanges 116 of the frame, pressure is exerted which causes the clamps 140 to retract and to pull the edges of the matrix into the grooves 144 of the matrix plate. Thereafter, the flanges 116, 117 and 118 of the frame 32 form a complete seal around the edges of the matrix and hold the same under tension if any shrinkage tends to occur as in cooling.

The frame 32 and the matrix plate 33 are locked in closed position by means of the rod 44 and the lock nut 50, the lock nut 50 being tightened by the handle 51 sufficiently to hold the flange 55 of the frame 32 firmly against the stationary flange 56.

The slide 30, when properly positioned with respect to the frame 32 by means of suitable adjustment of the bolts 37, is locked in its position by tightening the bolts 36. This adjustment is such that the side and bottom flanges 116 and 117 of the frame 32 effect a liquid-tight seal with the backing paper carried upon the slide 30 and with the clamp 87. The backing paper is preferably permitted to extend a substantial distance above the slide 30 so as to protect the top of the slide and the associated mechanism from the molten metal during the pouring operation.

With the parts thus assembled, the heating rods 103, 104 are energized to prevent the metal in the passage 150 and the metal around the clamp 87 from solidifying until the plate has been cast and the desired pressure applied thereto. The cooling water is automatically supplied to the coils 78 and 134, if the temperature of the slide and of the matrix plate exacts the predetermined value.

If, for example, a type metal is to be used having a pouring temperature of 550° F. and a freezing temperature of 475° F., the machine is preferably maintained at a temperature of about 120° F. The thermal-responsive devices 204, 210 may be adjusted to maintain the mold at about this selected temperature. If the machine is cold, as in the morning, one or more dummy plates may be cast to bring it up to the proper temperature. Thereafter, the temperature is controlled by the heating rods and by the cooling coils to maintain the desired casting conditions.

The molten metal is preferably maintained at a predetermined temperature which is most suitable for pouring purposes, such, for example, as a temperature of 550° F. as above mentioned. With the temperature of the metal before pouring and the temperature of the machine both constant, the plates are cast under uniform conditions and hence the cooling period, shrinkage, and other characteristics of the various plates are substantially the same.

With the machine at the required temperature, the metal is poured into the flared opening 151 and passes downwardly over the surface 62 of the slide, is deflected by the inclined surface 63, and thence falls over the surface 61 until the mold cavity gradually becomes full of molten metal. It is to be noted that the backward inclination of the machine causes the metal to flow downwardly over the backing plate instead of over the matrix, thereby preventing injury to the matrix impressions and preventing unequal heating or expansion of the matrix. As the metal gradually fills the mold cavity, any air which is caught between the back of the matrix and the matrix plate 33 gradually rises to the top where it is released through the apertures 160, thereby permitting the matrix to lie flat against the matrix plate.

The pouring is preferably continued until the molten metal fills the entire mold cavity and rises along the surface 62 to a point adjacent the flared opening 151. Thereafter, the foot pedal 189 is depressed, opening the valve 169 and allowing air from the reservoir 25 to enter the cylinder 165 and raise the piston 74. This causes an upward movement of the slide during which the clamp 87 operates as a plunger, agitates the metal, and forces the same upwardly and out through the aperture between the inclined surface 63 of the slide and the top flange 118 of the frame 32. Continued movement of the slide 30 causes the surface 61 to register with the face of the flange 118 and thereby substantially close the opening of the mold cavity. Thereafter, further movement of the slide compresses the molten metal within the mold cavity and causes the same to penetrate the impressions in the matrix.

This movement continues until the machine stalls, that is, until the pressure exerted by the molten metal balances the pressure applied to the piston 74. Furthermore, the sudden stoppage of movement of the slide 30, produced when the limit of compression of the molten metal is reached, produces an impact which greatly increases the pressure exerted upon the type metal.

The arrangement is such that, just before the piston 74 reaches the limit of its movement, the port 196 is uncovered and permits the air from the cylinder 165 to be applied through the pipe 76 and pressure-reduction valve 197 to the chamber 70 and thence through the bores 71 to the back of the backing paper 85. This air pressure serves to force the backing paper away from the slide, exerting pressure on the back of the casting to hold the printing face firmly against the matrix as the metal shrinks while cooling. The pressure-reduction valve 197 reduces the air pressure to a value such that the desired effect is obtained. Obviously, this valve may be omitted if the air in the cylinder is at the proper pressure for the above purpose.

The heating rods 103 and 104 maintain the metal in molten position at the constricted points of the mold until the casting has been completed. Obviously, the clamp 87 and the passage 150 must be free if the proper operation is to be obtained. The cooling coils 78 and 134 remove heat from the mold at the large flat surfaces of the casting, hasten solidification and prevent the mold from reaching too high a temperature due to continued casting operations. The controlled flow of cooling water in positive channels from the top to the bottom of the respective surfaces ensures a uniform, controlled cooling effect.

Inasmuch as the matrix is firmly clamped around its periphery by the flanges 116, 117 and 118, it is held under tension or in a stretched condition due to any shrinkage which may have taken place upon cooling from its original high temperature. The pressure which is maintained on the face of the matrix by means of the slide 30 and by the air applied to the backing paper 85 assists in holding the matrix flat against the matrix plate 33, whereby bulging or wrinkling, due to reheating by the hot metal, is prevented. Hence, the cast plate will correspond exactly in size and registration to the original impressions on the matrix.

If the pedal 189 is accidentally depressed when the mold is not filled with molten metal, the closed space at the top of the cylinder 165 acts as an air cushion to stop the piston and the slide without injury to the apparatus.

When the metal has cooled below its solidification temperature and while it is still at an elevated temperature, such as 120° F., the cast stereotype plate is removed from the machine and further cooling is effected in any convenient manner, using precautions to prevent buckling of the plate.

For removing the plate from the machine, the air pressure is released from the cylinder 165 by applying pressure to the rear edge 190 of the foot pedal 189, thereby withdrawing the link 182 from the abutment 184 and permitting the valve 169 to close. The weight of the slide then causes the piston 74 to return gradually to its lower position as the air leaks around the edges of the piston. The lock nut 50 may then be loosened by suitable manipulation of the handle 51 to permit the rod 44 to be swung away from the arm 43, whereupon the frame 32 and matrix plate 33 may be swung into the open position as illustrated in Figure 7. During this operation the stereotype plate will adhere to the matrix and will accordingly be released from the backing paper and will follow the frame 32 and the matrix plate 33 as the same are swung into open position.

When the matrix plate 33 is separated from the frame 32, as by relative pivotal movement about the pin 40, the matrix will separate from the cast stereotype plate and will be held by the clamps 140 against the matrix plate 33. The cast stereotype plate thereupon remains in the frame 32 and is held within the flanges 116, 117 and 118 thereof. The plate may then be manually removed from this frame and may be cooled in any suitable manner.

The gate between the flange 118 and the surface 62 of the slide 30 may include lugs formed by metal which has entered the recesses 153 and has solidified therein. These lugs cause the gate to adhere to the flange 118 of the frame 32 when the frame is opened. The gate may be removed therefrom by manipulating the handle 157 to cause the plungers 152 to push said lugs from the recesses 153 and may be remelted and used for further casting operations.

If desired, the passage 150 may be designed so as to provide a thin strip of metal interconnecting the cast stereotype plate and the gate. In such case, the plate hangs from the gate until torn away. This construction facilitates the removal of the plate from the frame 32, as it prevents the plate from dropping until it is gripped and torn loose from the gate.

It is contemplated that the same backing paper may be used for several casting operations. If further plates are to be cast, the machine may be reclosed and the above operation repeated. It is to be noted that the cooling coils maintain the machine at the required temperature by removing the heat of casting. Consequently, if the molten metal is always poured at a predetermined temperature, uniform results can be obtained.

Although the above machine may be used with any type of matrix, it is particularly adapted for use with the matrix described in my copending application Serial No. 714,916, filed March 10, 1934, for Matrix and method and apparatus for making the same. The matrix therein described is treated to obtain a uniform back surface from which all irregularities have been removed, for example, by grinding the surface while the matrix is still held in position on the type form. In this way the matrix is so formed that, when it is placed on the smooth surface of the matrix plate, the various impressions retain their original relative position and the stereotype plate cast therefrom in the above-described manner accurately reproduces the original form from which the matrix was impressed.

When used in this manner, the stereotype plate is ready for mounting as soon as the back is planed to the desired thickness. The printing face is accurate because the matrix is accurately formed to eliminate all irregularities therefrom, the matrix is held against a flat surface in the mold, the matrix is prevented from bulging or distorting, the plate is held in engagement with the matrix while cooling and solidifying, and the casting operation is carried out at predetermined temperatures. The process accordingly reduces the manipulative steps to a minimum, renders manual correction of the plate unnecessary, and produces a cast stereotype plate at low cost having characteristics suitable for high quality printing.

It is to be understood that the present invention is equally applicable to the casting of curved or flat stereotype plates. A machine for producing flat plates has been illustrated by way of example only and not as a limitation of the invention.

Although a particular embodiment of the invention has been shown and described for purposes of illustration, it is to be understood that various changes and modifications may be made therein by a person skilled in the art without departing from the scope of the invention which is only to be limited in accordance with the following claims when interpreted in view of the prior art.

The apparatus illustrated and described in this application is claimed in my co-pending application Serial No. 28,439, filed June 26, 1935.

I claim:

1. A method of casting stereotype plates in a mold which comprises substantially closing the mold, applying pressure to the molten metal to compress the metal and to force the metal into the matrix impressions, and, before the metal solidifies, applying pressure to the entire back of the cast stereotype plate to hold the plate in pressure engagement with the matrix and to compensate for shrinkage.

2. The process of casting stereotype plates which comprises applying an impact to the molten metal to compress the same, and to cause the same to penetrate the matrix impressions, maintaining the molten metal under pressure, and applying pressure to the back of the cast plate adapted to compensate for shrinkage as the plate cools.

3. The method of casting stereotype plates in a mold which comprises applying molten metal to the mold, closing the mold and applying pressure to the molten metal sufficient to compress the metal and force the same into the matrix impressions and, while the metal is solidifying, applying fluid pressure to the back surface of the cast plate to hold the plate in pressure engagement with the matrix and to compensate for shrinkage.

4. The method of casting stereotype plates in a mold which comprises maintaining the molten metal under fluid pressure until solidification takes place so as to force the metal into the matrix impressions and as the fluid pressure diminishes, due to solidification, supplementing the same by applying additional pressure to the back of the cast plate so as to hold the plate in pressure engagement with the matrix until the plate is completely solidified.

5. A method of casting stereotype plates in a mold which comprises placing a matrix containing impressions of the printing faces, and a flexible backing sheet on opposite supporting surfaces of a mold to form a mold cavity therebetween, pouring molten metal into said mold cavity, holding said molten metal under fluid pressure to force the same into the impressions in the matrix, to remove air therefrom and to prevent buckling of the matrix, and as the metal solidifies applying fluid pressure in back of said backing material and over substantially the entire area thereof to cause the backing material to apply pressure against substantially the entire back of the cast plate so as to compensate for shrinking of the metal while cooling and to maintain the plate in pressure engagement with the matrix throughout the casting operation.

GEORGE W. BUNGAY.